(12) United States Patent
Brandt

(10) Patent No.: US 6,950,410 B1
(45) Date of Patent: Sep. 27, 2005

(54) FREQUENCY MULTIPLEXER

(75) Inventor: Per-Olof Brandt, Staffanstorp (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 730 days.

(21) Appl. No.: 09/617,678

(22) Filed: Jul. 14, 2000

(51) Int. Cl.[7] ................................. H04L 5/14
(52) U.S. Cl. .................. 370/276; 370/297; 455/78; 455/83
(58) Field of Search .................... 370/273, 275, 370/276, 278, 279, 282, 293, 295, 297, 308, 370/309; 455/82–84; 345/850, 852; 333/173–176

(56) References Cited

U.S. PATENT DOCUMENTS

| 5,652,599 | A | * | 7/1997 | Pitta et al. .................. 343/858 |
| 5,697,069 | A |   | 12/1997 | Böhm et al. |
| 6,023,611 | A | * | 2/2000 | Bolin et al. .............. 455/114.1 |
| 6,308,051 | B1 | * | 10/2001 | Atokawa ..................... 455/78 |
| 6,332,071 | B1 | * | 12/2001 | Brandt ........................ 455/82 |

FOREIGN PATENT DOCUMENTS

| DE | 19842706 | 3/2000 |
| EP | 980109 | 2/2000 |
| EP | 1014592 | 6/2000 |
| WO | 99/52172 | 10/1999 |

* cited by examiner

Primary Examiner—Frank Duong
(74) Attorney, Agent, or Firm—Potomac Patent Group, PLLC

(57) ABSTRACT

Multiple circuits connected to a common terminal are switched where the frequency bands to be conducted through the circuits are close. Each circuit has an independent signal path to the common terminal which contains a filter and a device. Each device has a first and a second state. Each circuit has a first filter characteristic that passes a first frequency band and substantially blocks the second frequency band. Each circuit has a second filter characteristic which substantially blocks the first and second frequency bands when the device is in the second state, wherein the second filter characteristic is a result of the device and a filter acting in combination. As a result, the frequency multiplexer can have multiple frequency bands in a narrow frequency range connected to a common terminal with minimum signal loss.

16 Claims, 4 Drawing Sheets

FREQUENCY MULTIPLEXER

BACKGROUND

The present invention relates generally to radio frequency communication systems and in particular to switching devices for switching between various frequency bands. The present invention is a device and method for switching two radio frequency signals that have relatively close or even the same frequency band.

Cellular phone systems are rapidly expanding throughout the world. As the requirement for cellular communication increases the number frequency bands used to communicate will also increase. Additionally, as different standards are implemented, they may also require different and narrower frequency bands on which to conduct the communications. Close frequency bands such as 1750 MHz /1900 MHz /2100 MHz may be implemented on a variety of systems. For example operating frequencies for some existing systems include PCN (Personal Communication Network) 1710–1800 MHz, PCS (Personal Communication System) 1850–1990 MHz, and DECT (Digital European Cordless Telephone) 1880–1900 MHz. Additional systems such as WCDMA (Wideband Code Division Multiple Access), GSM (Global System for Mobile Communication), DCS (Digital Cellular System), and the like, may require additional bands in a limited range of frequencies. Additionally each system can require different circuits/components (Tx/Rx switches, amplifiers, etc.) in the signal paths to be combined at a common terminal, for instance an antenna. It is desirable to be able to access multiple systems as not all geographic areas are served by the same system. Therefore, it is desirable to be able to support various systems with one device. To do so, it is preferred to connect various signal paths to a common terminal to avoid the substantial costs and space requirements of providing separate devices for each system used.

Some communication systems allow for multifrequency systems that have frequency bands that are widely separated. For instance, current GSM systems operate at 900 MHz whereas DCS systems operate at 1750 MHz. The wide frequency band separation allows for a frequency diplexer system as shown in FIG. 1 and described in published PCT application WO 99/52172 and related copending U.S. application Ser. No. 09/287,546, the content of which is hereby incorporated by reference in its entirety. The system has a low band input 100 and high band input 200 coupled at a common output 300 such as an antenna. The low frequency signal path includes a filter formed by inductor L101, and capacitors C101 and C102. Similarly, the high frequency path additionally includes a filter formed by inductors L201 and L202 and capacitor C201. The filters each have a passband corresponding to the frequencies of the respective low band and high band frequencies and correspondingly block the other frequencies. The wide separation of the low and high frequency bands allows the filters to conduct the desired low band 100 or high band 200 frequency signal and reject the non-desired frequency signal. For example, when the low band input 100 is active, the filter 205 in the high band path effectively blocks the low band output coupled at the output 300 from reaching the high band input 200. Similarly, when the high band input 200 is active, the filter 105 in the low band path effectively blocks the high band output coupled at the output 300 from reaching the low band input 100.

Although the diplexer system depicted in FIG. 1 can be useful in applications where the frequency band separation is wide, it would not be effective for systems where the frequency bands are relatively close such as DCS at 1750 MHz and GSM-1900 at 1900 MHz, which is a new alternative frequency band for the GSM system. Specifically, when the frequency bands are relatively close, the filters could not provide both a passband to allow a signal to conduct from the input to the common output at the desired frequency, and still block the non-desired frequency when the other input is conducting.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

The present invention allows for various signals having relatively close frequency bands to be connected to a common terminal. The present invention provides a frequency multiplexer for switching between frequency bands comprising a plurality of circuits, connected to a common terminal. Each of the plurality of circuits comprises a filter and a device connected to the filter. The device has first and second states. Each circuit has a first filter characteristic that passes a first frequency band and substantially blocks a second frequency band when the device is in the first state. Each circuit has a second filter characteristic which substantially blocks the first and second frequency bands when the device is in the second state, wherein the second filter characteristic is a result of the device and the filter acting in combination.

The above features and advantages of the present invention will be more apparent and additional features and advantages of the present invention will be appreciated from the following detailed description of the invention made with reference to the drawings.

BRIEF DESCRIPTION OF THE DRAWINGS

The present invention will now be described with reference to the following figures, in which.

DETAILED DESCRIPTION

Before addressing the specifics of the various embodiments of the invention a brief overview of the invention will be provided.

The present invention provides a frequency multiplexer for switching between frequency bands. The frequency multiplexer passes first and second high frequency band signals through respective independent circuits that are interposed between independent terminals and a common terminal. Each circuit contains a filter and a device. Each circuit has a first filter characteristic that passes a first frequency band and substantially blocks a second frequency band when the device is in the first state. Each circuit has a second filter characteristic which substantially blocks the first and second frequency bands when the device is in the second state, wherein the second filter characteristic is a result of the device and the filter acting in combination. Preferably, when signals are conducted between one circuit and the common terminal, the devices of the other circuit is placed in the second state. For example, when the first high frequency band is active, the device in the second circuit is placed in the second state thereby substantially blocking the first and second high frequency bands and the low frequency band. The device in the first circuit is placed in the first state to allow signals of the first high frequency band to be conducted between the first circuit and the common terminal. Alternatively, when the second high frequency band is active, the device in the first circuit is placed in the second state thereby substantially blocking the first and second high frequency bands and the low frequency band. The device in the second circuit is placed in the first state to allow signals of the second high frequency band to be conducted between the first circuit and the common terminal.

An alternate circuit for accommodating a low frequency band can also be provided as in the diplexer described above. Specifically, the low frequency band circuit contains a filter connected to the common terminal, wherein the filter is designed to pass the low frequency band and block the frequencies of all of the high frequency bands.

In one embodiment of the present invention, each device contains a switching device and a capacitor. In another embodiment each switch device is a diode, preferably a PIN diode that provides high linearity and low power consumption.

Figure 2:
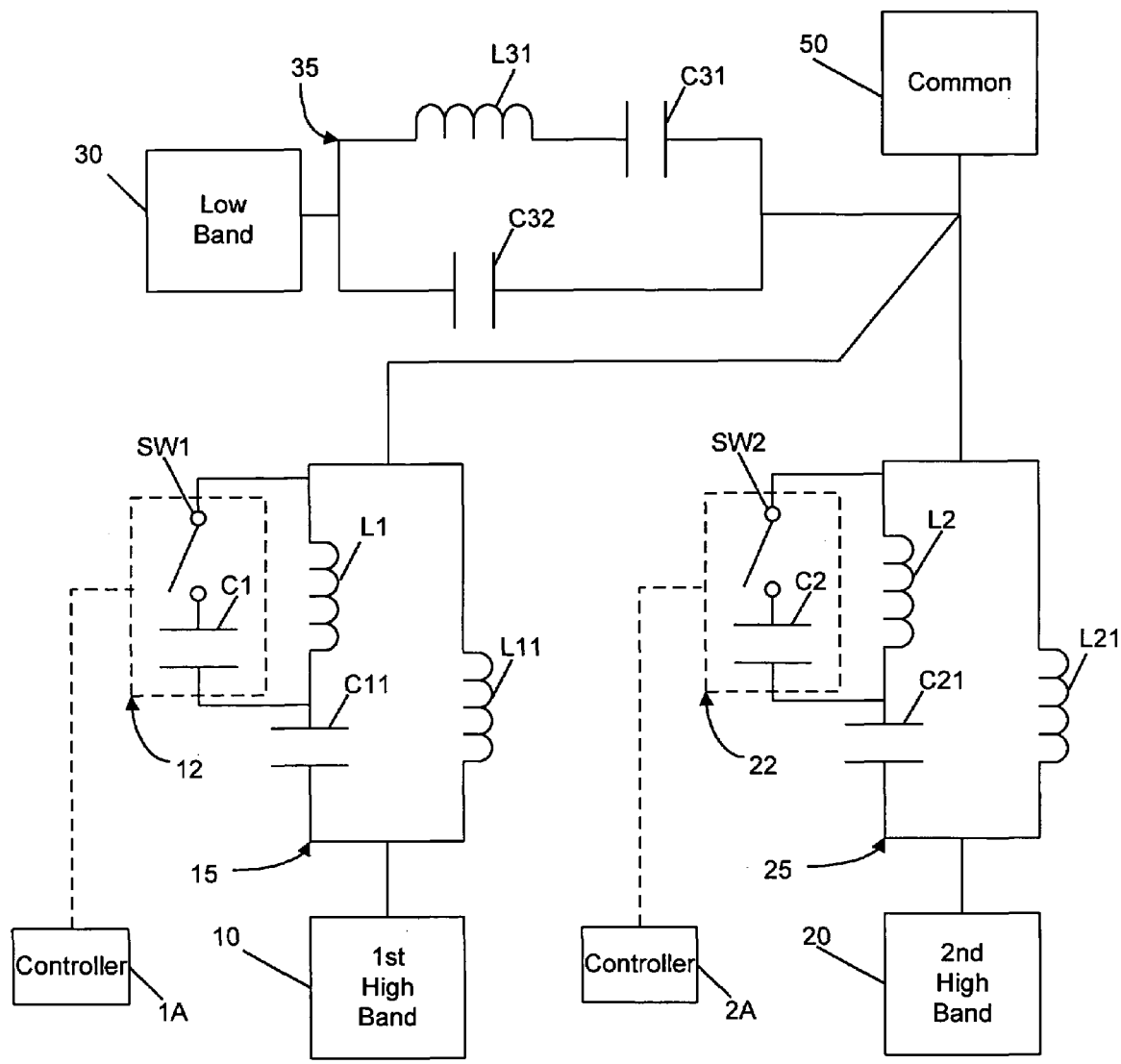
FIG. 2 shows an exemplary frequency multiplexer of the present invention.

Now referring to FIG. 2, a frequency multiplexer that advantageously incorporates the present invention is shown. In one embodiment, a first high frequency band terminal 10, a second high frequency band terminal 20, and a low frequency band terminal 30 are connected to a common terminal 50 through individual filters 15, 25, and 35 respectively. The individual frequency band terminals 10, 20, and 30 may contain a variety of additional components such as isolators, low pass filters, amplifiers, DC sources, and the like, and are represented in block diagram form. For purposes of the present invention, it is necessary only that the signal paths are separate and are to be combined at common terminal 50. The frequency band of the low band terminal 30 will be widely separated from the frequencies of the first high band terminal 10 and second high band terminal 20. However, the high frequency bands of terminal 10 and terminal 20 are close to one another and could even be the same frequency.

The high frequency band portion of the present invention provides a first filter 15 formed from inductors L1, L11, and capacitor C11 and a second filter 25 formed from inductors L2, L21, and capacitor C21. A first circuit is formed by filter 15 and device 12. The first circuit is connected between terminal 50 and terminal 10. The second circuit is formed by filter 25 and device 22. The second circuit is connected between terminal 50 and terminal 20. Each device has a first and a second state. Each circuit has a first filter characteristic that passes a first frequency band and substantially blocks the second frequency band when the device is in the first state. Each circuit has a second filter characteristic which substantially blocks the first and second frequency bands when the device is in the second state, wherein the second filter characteristic is a result of the device and a filter acting in combination. The following functional description will be addressed in terms of a switch device SW1 and a capacitor C1, as representative of device 12 and in terms of a switch device SW2 and a capacitor C2 as representative of device 22. Although each device has been represented by a switch device and a capacitor, the invention is not limited to this embodiment.

Figure 1:
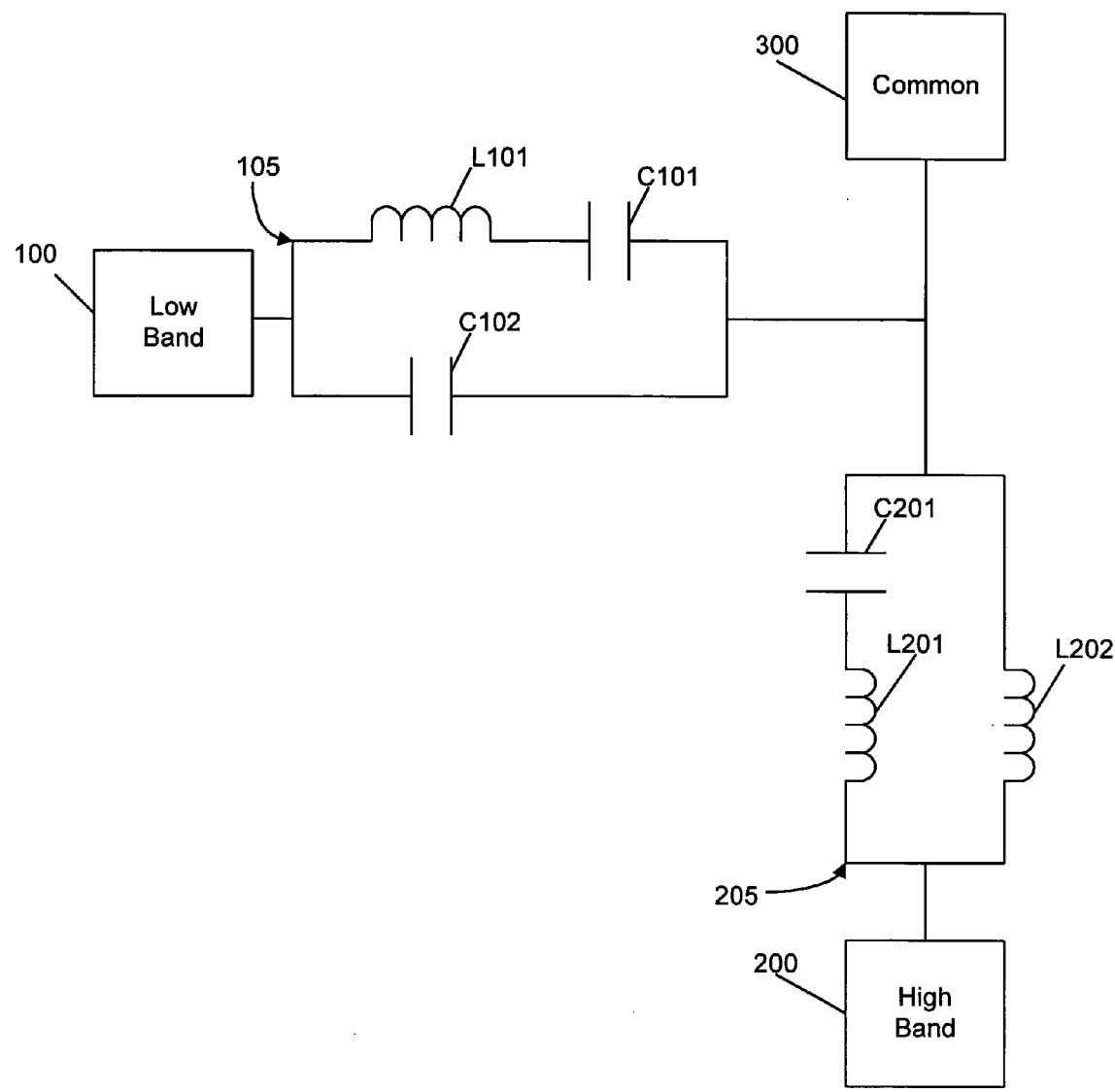
FIG. 1 shows a diplexer circuit having low band and high band terminals connected through filters to a common terminal.

Each signal path is similar to the high band path of the diplexer as shown in FIG. 1. However to effectively multiplex signals having relatively close bands, additional components are provided in the high band signal paths. The signal paths are formed by the first and second circuits which contain switching devices SW1, SW2, capacitors C1, C2, and filters 15, 25, respectively. Additionally, controllers 1A, 2A are provided to selectively place the first device 12 and second device 22 in the first and second state, respectively. Specifically, relating to FIG. 2, controller 1A is provided to turn switch device SW1 on and off and controller 2A is provided to turn switch device SW2 on and off. It will be appreciated by those skilled in the art that the individual controllers 1A, 2A could be replaced by a single controller that can control both devices.

When a signal is being conducted between terminal 20 and terminal 50, SW1 is turned on by controller 1A placing capacitor C1 in the signal path between terminal 10 and terminal 50. Capacitor C1 forms, along with the components of filter 15, a second filter characteristic between terminal 10 and terminal 50 that substantially blocks both low and high band signals from being conducted between terminal 10 and terminal 50. Switch device SW2 is turned off by controller 2A. Therefore, the signal path between terminal 20 and terminal 50 effectively contains only filter 25. Thus, the second circuit has a first filter characteristic that is capable of passing its intended frequency band.

Alternatively, when a signal is to be conducted between terminal 10 and terminal 50, switch device SW2 will be turned on by controller 2A placing capacitor C2 in the signal path between terminal 20 and terminal 50. Capacitor C2 forms, along with the components of filter 25, a second filter characteristic between terminal 20 and terminal 50 that substantially blocks both low and high band signals from being conducted between terminal 20 and terminal 50. Switch device SW1 is turned off by controller 1A and the signal path between terminal 10 and terminal 50 effectively contains only filter 15. Thus, the first circuit has a first filter characteristic that is capable of passing its intended frequency band.

The functioning of the frequency multiplexer in relation to the low band signal path, that includes terminal 30 and an alternate circuit formed by filter 35, is similar to that of the diplexer shown in FIG. 1. Specifically, the wide separation of the low and high frequency bands allows the filter 35, formed by inductor L31 and capacitors C31 and C32, to conduct the desired low band signals between terminal 30 and terminal 50 and reject the high band signals associated with the filters 15 and 25. Therefore, it is not necessary to provide additional elements to the low band signal path. Additionally, when the low band terminal 30 is active both switch devices SW1 and SW2 can remain open because the action of the filter 15 and filter 25 is sufficient to block the low band signal. Thus, no additional power is consumed.

Although the foregoing example used only two high frequency bands to be switched, the present invention allows for additional frequency bands to be added by providing corresponding filters, devices, and controllers as previously described. Regardless of the additional bands added, by substantially blocking the first and second frequency bands in each inactive signal path, the frequency multiplexer will function with minimal signal loss.

Figure 3:
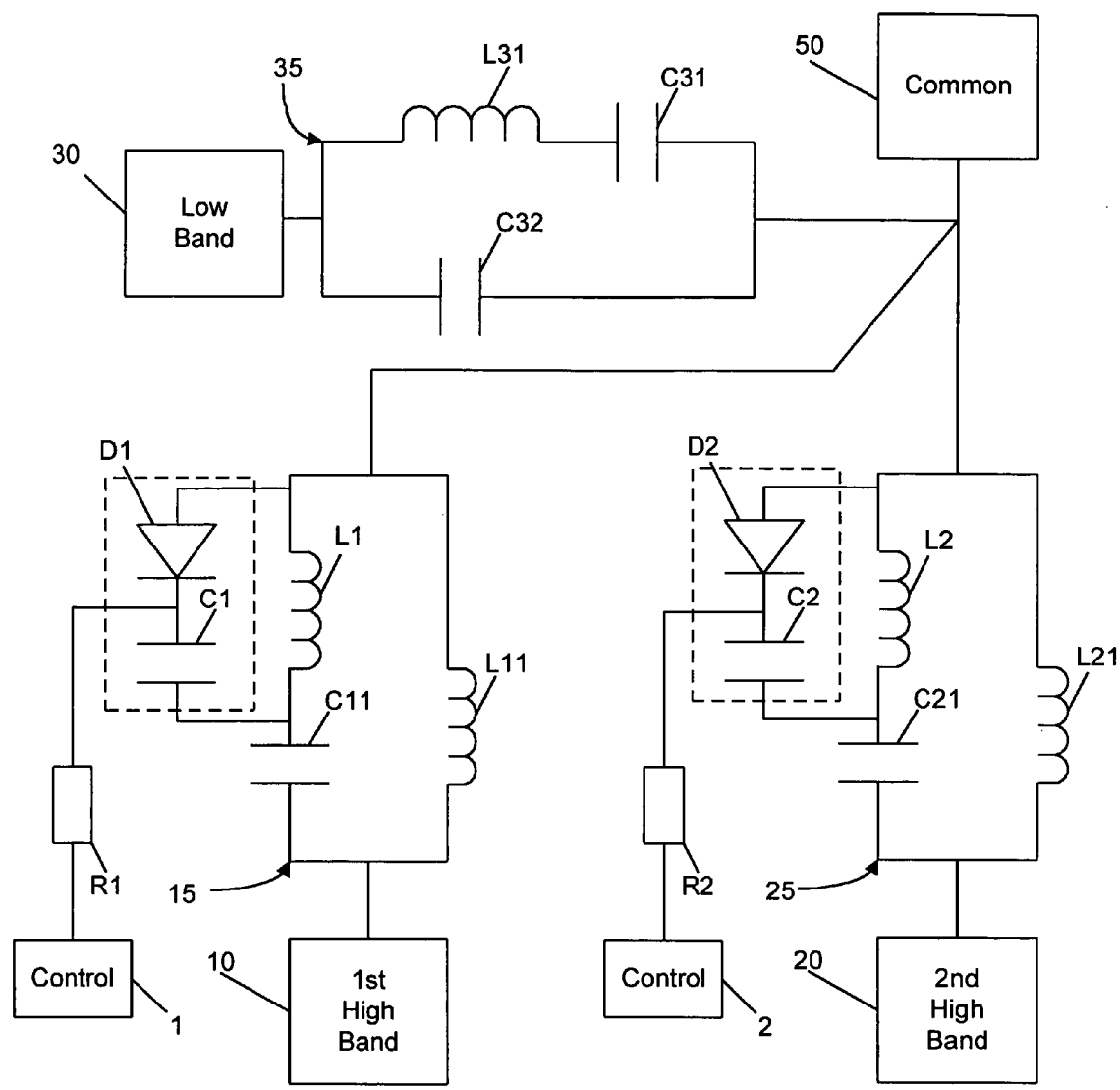
FIG. 3 shows a preferred embodiment of a frequency multiplexer of the present invention.

Referring to FIG. 3, another embodiment is shown wherein the switching function is performed by diodes. All similarly labeled components in FIGS. 2 and 3 perform the same function so a complete recitation of the entire system will not be provided.

In the preferred embodiment diode D1 acts as a switch device to effectively open or close with respect to capacitor C1 and diode D2 acts as a switch device to effectively open or close with respect to capacitor C2. Control circuit 1 controls whether diode D1 is on or off. When diode D1 is desired to be switched on, DC current controlled by control circuit 1 is passed through diode D1. The DC current is drawn from a DC source (not shown) in terminal 10 and/or terminal 20 or other suitable connection as known in the art. Resistor R1 serves to limit the DC current conducted through D1. Additionally, resistor R1 serves as a high impedance to block high and low band signals from leaking into control circuit 1. Likewise control circuit 2 controls whether diode D2 is on or off. When diode D2 is desired to be switched on, DC current controlled by control circuit 2 is passed through diode D2. The DC current is drawn from a DC source (not shown) in terminal 10 and/or terminal 20 or other suitable connection as known in the art. Resistor R2 serves both to limit the DC current conducted through D2 and as a high impedance to block signals from leaking into control circuit 2.

Operationally similar to the embodiment shown in FIG. 2, when signals between terminal 10 and terminal 50 are to be conducted diode D2 is turned on. Turning on diode D2 causes capacitor C2 to be placed in the signal path between terminals 20 and 50. Inductor L2 and capacitor C2 form a parallel resonant circuit which blocks the high frequency signals. The existing parallel resonant circuit formed by C21 and L21 already serves to block low frequency signals. Capacitor C2 is designed so that the circuit formed by capacitor C2, inductor L2, capacitor C21 and inductor L21 create a high impedance between terminal 50 and terminal 20 with respect to both the high and low frequency bands, thereby substantially blocking any signal transmission. Diode D1 of the first circuit remains off and therefor capacitor C1 is effectively removed from the first circuit and the signal path from terminal 10 to terminal 50 contains only filter 15, which is designed to pass the desired frequency band of terminal 10.

If signals are to be conducted between terminal 20 and terminal 50 then diode D2 is turned off and diode D1 is turned on, thereby placing capacitor C1 in the signal path between terminals 10 and 50. Capacitor C1 forms a parallel resonant circuit with inductor L1. The existing parallel resonant circuit formed by C11 and L11 already serves to block low frequency signals. Capacitor C1 is also selected such that when included with filter 15, a high impedance is formed at both the high and low band frequencies with respect to the signal path between terminal 10 and terminal 50, thereby blocking any signal transmission between terminal 50 and terminal 10. Likewise with diode D2 off, capacitor C2 is effectively removed from the second circuit so that the signal path from terminal 20 to terminal 50 contains only filter 25 which is designed to pass the desired frequency band of terminal 20.

A PIN diode is preferred to be used as the switching diode because the PIN diode is very linear, can conduct high currents and requires less than 0.2 ma of current per diode for switching. Also as previously discussed the low frequency band signal path is not modified from the diplexer arrangement so that when the low band is in use both diodes may be left off and therefore no additional power consumption is required.

Figure 4:
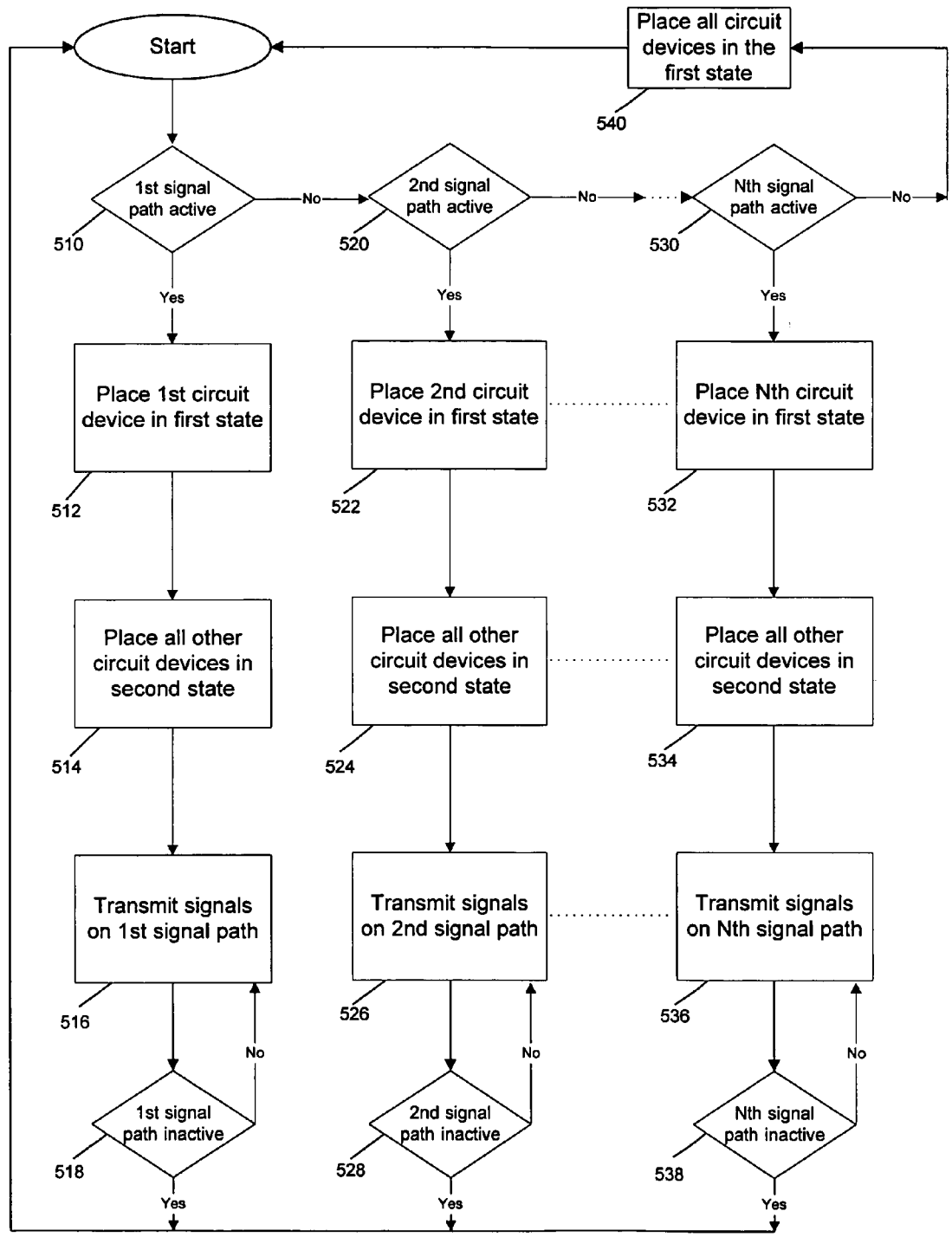
FIG. 4 shows a flow chart of a method of implementing a frequency multiplexer of the present invention.

The flow chart of FIG. 4 presents a method of implementing a frequency multiplexer of the present invention that may be implemented by a controller or individual controllers of each circuit. The method starts by determining if any of the signal paths are active, for example selected to transmit a signal, in steps 510, 520, and 530. If none of the signal paths are active then each device of all circuits is placed in a first state, in step 540. With each device in the first state, each circuit can conduct a first frequency band and substantially block all second frequency bands. Each device also has a second state. In the second state, each device acting in combination with a filter of each circuit alters the frequency response of the circuit such that all first and second frequency bands are substantially blocked. In each first state, each device does not alter the frequency response each filter, subsequently each first frequency band is passed and all second frequency bands are substantially blocked. All first frequency bands must be relatively close to each other and all second frequency bands must relatively close to each other. Additionally, there should be wide frequency separation between all first frequency bands and all second frequency bands.

If a first signal path is active, then in step 512, a device of the first circuit is placed in the first state, thereby allowing the first circuit to pass its first frequency band. All other devices in the remaining circuits are placed in their second state, in step 514. Consequently, all first and second frequency bands will be substantially blocked in the inactive signal paths. With the frequency multiplexer properly configured, in steps 516, the signal can be transmitted in the first signal path. In step 518, the first signal path is checked to verify it is still active. Upon deactivation of the signal path, the process returns to the start and proceeds to look for active signal paths.

Upon finding a second signal path active, in step 520, the device of the second circuit is placed in the first state, thereby allowing the second circuit to pass its first frequency band, in step 522. All other devices of the remaining circuits are placed in their second state, in step 524, thereby substantially blocking all first and second frequency bands in the inactive signal paths. In steps 526, with the frequency multiplexer properly configured, the signal can be transmitted in the second signal path. In step 518, the second signal path is checked to verify it is still active. Upon deactivation of the second signal path, the process returns to the start and proceeds to look for active signal paths.

Upon finding the Nth signal path active, in step 530, the device of the Nth circuit is placed in the first state, thereby allowing the Nth circuit to pass its first frequency band, in step 532. All other devices of the remaining circuits are placed in their second state, in step 534, which substantially blocks all first and second frequency bands in the inactive signal paths. In steps 536, with the frequency multiplexer properly configured, the signal can be transmitted in the Nth signal path. In step 538, the Nth signal path is checked to verify it is still active. Upon deactivation of the Nth signal path, the process returns to the start and proceeds to look for active signal paths.

The foregoing has described the principles, preferred embodiments and modes of operation of the present invention. However, the invention should not be construed as being limited to the particular embodiments discussed above. For example an embodiment described above used a diode switch. However, one skilled in the art will appreciate that the present invention may be practiced by using any appropriate switching device such as transistors, MESFETs, and the like. Also the filters contained only three passive elements, however one skilled in the art would recognize the same results can be reached by a variety of different combinations of both passive and active devices. Still further one skilled in the art should recognize that the invention could be practiced to provide a plurality of low band signal paths, with the low bands being relatively close to one another. This may be accomplished, for example, by switching an additional inductor connected to the filter in the low band and selecting the inductor to create with the filter a high impedance in the low band signal path.

Additionally, alternative embodiments to the above method steps will be recognized by those skilled in the art. As an example, the second set of frequency bands could have a parallel set of signal paths that would be multiplexed in the same manner. In such a system, a signal path in the first (high) frequency bands and a signal path in the second (low) frequency bands could be selected independent of each other. In another alterative embodiment, various methods of weighting and prioritizing signal paths could be added to the signal activity detection/selection process.

Therefore, the above-described embodiments should be regarded as illustrative rather than restrictive, and it should be appreciated that variations may be made in those embodiments by workers skilled in the art without departing from the scope of the present invention as defined by the following claims.

What is claimed is:

1. A frequency multiplexer for switching between frequency bands comprising:
    a plurality of circuits, connected to a common terminal, wherein each of the circuits comprises:
        a filter; and a device connected to the filter, wherein the device has first and second states;
    each circuit has a first filter characteristic that passes a first frequency band and substantially blocks a second frequency band when the device is in the first state;
    each circuit has a second filter characteristic which substantially blocks the first and second frequency bands when the device is in the second state, wherein the second filter characteristic is a result of the device and the filter acting in combination; and
    a controller that selectively places each said device in the first state or the second state, wherein one of the plurality of circuits is conducting signals of the first frequency band the controller places each remaining device of the plurality of circuits in the second state.

2. The frequency multiplexer of claim 1 wherein each of the first frequency bands is a high frequency band and each of the second frequency bands is a low frequency band.

3. The frequency multiplexer of claim 1 wherein the controller comprises a plurality of individual controllers, each for controlling the device of a corresponding one of the circuits.

4. The frequency multiplexer of claim 1 wherein each said device comprises:
    a switch device; and
    an element.

5. The frequency multiplexer of claim 4 wherein said element is a capacitor.

6. The frequency multiplexer of claim 4 wherein said switch device is a diode.

7. The frequency multiplexer of claim 6 wherein each diode is a PIN diode.

8. The frequency multiplexer of claim 1 wherein each said second frequency band of said plurality of circuits is a same frequency band.

9. The frequency multiplexer of claim 8 further comprising:
    an alternate circuit having a filter and a filter characteristic that passes each said second frequency band of said plurality of circuits and substantially blocks each said first frequency band of said plurality of circuits.

10. The frequency multiplexer of claim 9 wherein said controller places each said device into the first state when the alternate circuit is conducting signals of the second frequency band.

11. The frequency multiplexer of claim 1 wherein each filter comprises:
    a first inductor connected in series with a filter capacitor; and
    a second inductor connected in parallel with both the first inductor and the filter capacitor.

12. The frequency multiplexer of claim 11 wherein each device comprises:
    a first capacitor connected in series with a switch device, wherein the switch device and the first capacitor are connected in parallel with the first inductor.

13. The frequency multiplexer of claim 12 wherein each switch device is a diode.

14. The frequency multiplexer of claim 13 wherein each diode is a PIN diode.

15. A method for switching between frequency bands comprising the steps of:
    selecting an active circuit from a plurality of circuits, wherein
        each circuit is connected to a common terminal,
        each circuit has a first filter characteristic that passes a first frequency band and substantially blocks a second frequency band when a device is in the first state, and
        each circuit has a second filter characteristic which substantially blocks the first and second frequency bands when the device is in the second state, wherein the second filter characteristic is a result of the device and a filter acting in combination;
    setting the device of the active circuit into the first state; and
    setting the devices of all non-selected circuits into a second state.

16. The method of claim 15 further comprising the step of:
    conducting a signal through the active circuit, wherein the signal is of the first frequency band of the active circuit.

* * * * *

UNITED STATES PATENT AND TRADEMARK OFFICE
CERTIFICATE OF CORRECTION

PATENT NO. : 6,950,410 B1
DATED : September 27, 2005
INVENTOR(S) : Per-Olof Brandt It is certified that error appears in the above-identified patent and that said Letters Patent is hereby corrected as shown below:

Column 3,
Line 2, change "first" to -- second --.

Column 7,
Line 51, after "wherein" insert -- when --.

Signed and Sealed this

Eleventh Day of April, 2006

JON W. DUDAS
*Director of the United States Patent and Trademark Office*